US012001637B2

(12) United States Patent
Gong

(10) Patent No.: US 12,001,637 B2
(45) Date of Patent: Jun. 4, 2024

(54) TOUCH MODULE, TOUCH DISPLAY SCREEN, AND ELECTRONIC DEVICE

(71) Applicants: Chengdu BOE Optoelectronics Technology Co., Ltd., Sichuan (CN); BOE Technology Group Co., Ltd., Beijing (CN)

(72) Inventor: Qing Gong, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/775,731

(22) PCT Filed: Jun. 18, 2021

(86) PCT No.: PCT/CN2021/100956
§ 371 (c)(1),
(2) Date: May 10, 2022

(87) PCT Pub. No.: WO2021/254490
PCT Pub. Date: Dec. 23, 2021

(65) Prior Publication Data
US 2023/0094766 A1    Mar. 30, 2023

(30) Foreign Application Priority Data

Jun. 19, 2020 (CN) .......................... 202010568114.1

(51) Int. Cl.
*G06F 3/044* (2006.01)
*G06F 1/16* (2006.01)
*G06F 3/041* (2006.01)

(52) U.S. Cl.
CPC .......... *G06F 3/0446* (2019.05); *G06F 1/1626* (2013.01); *G06F 1/1643* (2013.01); *G06F 3/0412* (2013.01); *G06F 2203/04112* (2013.01)

(58) Field of Classification Search
CPC .... G06F 3/0446; G06F 3/0412; G06F 1/1626; G06F 1/1642; G06F 2203/04112
See application file for complete search history.

(56) References Cited

U.S. PATENT DOCUMENTS 10,324,575 B2 * 6/2019 Hwang ................. G06F 3/0446
2015/0324056 A1 11/2015 Sato
(Continued)

FOREIGN PATENT DOCUMENTS

| CN | 107422932 A | 12/2017 |
| CN | 108984046 A | 12/2018 |

(Continued)

OTHER PUBLICATIONS

Ji-Lu et al., CN 110502152 A machine translation (Year: 2019).*

*Primary Examiner* — Peter D McLoone
(74) *Attorney, Agent, or Firm* — IPro, PLLC

(57) ABSTRACT

A touch module includes a carrier layer, a first metal mesh layer, an insulating layer, and a second metal mesh layer which are stacked; the first metal mesh layer includes a second electrode located in a third region, the second metal mesh layer includes a first electrode located in a second region, and the third region overlaps the second region. In this case, the capacitive signal intensity of a touch unit formed by the first electrode and the second electrode is large. On this basis, by arranging the second region and the third region at a position corresponding to an opening or an arc corner of the display screen, the touch precision and the touch sensitivity at the position can be effectively improved.

19 Claims, 11 Drawing Sheets

(56) References Cited

U.S. PATENT DOCUMENTS

| | | | |
|---|---|---|---|
| 2016/0103517 A1 | 4/2016 | Kang et al. | |
| 2018/0348906 A1* | 12/2018 | Hwang | G06F 3/0446 |
| 2019/0042019 A1 | 2/2019 | Ding et al. | |
| 2021/0026497 A1* | 1/2021 | Lee | G06F 3/0448 |
| 2021/0149525 A1 | 5/2021 | Xu et al. | |
| 2021/0263618 A1 | 8/2021 | Hwang et al. | |

FOREIGN PATENT DOCUMENTS

| | | |
|---|---|---|
| CN | 109360494 A | 2/2019 |
| CN | 110502152 A | 11/2019 |
| CN | 110874160 A | 3/2020 |

* cited by examiner

TOUCH MODULE, TOUCH DISPLAY SCREEN, AND ELECTRONIC DEVICE

CROSS-REFERENCE TO RELATED APPLICATION

The present disclosure is a U.S. national stage of international application No. PCT/CN2021/100956, filed on Jun. 18, 2021, which claims priority to Chinese patent application No. 202010568114.1, filed on Jun. 19, 2020 and entitled "TOUCH MODULE, TOUCH DISPLAY SCREEN, AND ELECTRONIC DEVICE", the entire contents of which are incorporated herein by reference.

TECHNICAL FIELD

The present disclosure relates to the field of display technologies, and in particular relates to a touch module, a touch display screen and an electronic device.

BACKGROUND

In the existing handheld display devices, such as mobile phones and tablet computers, their display screens are provided with holes for disposing apparatuses such as an amplifier and a camera. In addition, to make a mobile phone rounded and more comfortable for holding, corners of its display screen are arc-shaped.

SUMMARY

The present disclosure provides a touch module, a touch display screen, and an electronic device. The solutions are as follows.

In an aspect, a touch module is provided. The touch module includes:
 a carrier layer, a first metal mesh layer, an insulating layer and a second metal mesh layer that are sequentially laminated; wherein
 the second metal mesh layer is provided with a first region and a second region, and the second metal mesh layer includes a plurality of touch units disposed in the first region and a first electrode disposed in the second region, wherein the first electrode is coupled to a first touch unit of the plurality of touch units, and the first touch unit is adjacent to a first side of the second region; and
 the first metal mesh layer is provided with a third region, an orthographic projection of the third region on the carrier layer being overlapped with an orthographic projection of the second region on the carrier layer, and the first metal mesh layer includes a second electrode disposed in the third region, wherein the second electrode is coupled to a second touch unit of the plurality of touch units, the second touch unit is adjacent to another side of the second region, and the first electrode and the second electrode are configured to form a target touch unit.

Optionally, the orthographic projection of the third region on the carrier layer and the orthographic projection of the second region on the carrier layer coincide with each other.

Optionally, the first side and a second side are two adjacent sides of the second region.

Optionally, each of the touch units in the first region includes a sensing electrode and a driving electrode; wherein
 the first electrode is coupled to one of the sensing electrode and the driving electrode of the first touch unit, and the second electrode is coupled to the other one of the sensing electrode and the driving electrode of the second touch unit.

Optionally, an orthographic projection of the first electrode on the carrier layer and the orthographic projection of the second region on the carrier layer coincide with each other, and an orthographic projection of the second electrode on the carrier layer and the orthographic projection of the third region on the carrier layer coincide with each other.

Optionally, the second region is hollowed out in the middle, and the third region is hollowed out in the middle;
 wherein an orthographic projection of a hollowed-out portion of the second region on the carrier layer is overlapped with an orthographic projection of a hollowed-out portion of the third region on the carrier layer.

Optionally, the orthographic projection of the hollowed-out portion of the second region on the carrier layer and the orthographic projection of the hollowed-out portion of the third region on the carrier layer coincide with each other.

Optionally, a size of the second region is the same as a size of a region occupied by one touch unit in the first region, and a shape of the second region is the same as a shape of the region occupied by the one touch unit in the first region.

Optionally, the second metal mesh layer includes one first electrode disposed in the second region; and a quantity of the second electrodes in the first metal mesh layer equals a quantity of the first electrodes in the second metal mesh layer.

Optionally, a size of the second region is the same as a size of a region occupied by the plurality of touch units in the first region, and a shape of the second region is the same as a shape of the region occupied by the plurality of touch units in the first region.

Optionally, the second metal mesh layer includes one or more first electrodes disposed in the second region; and
 a quantity of the second electrodes in the first metal mesh layer equals a quantity of the first electrodes in the second metal mesh layer.

Optionally, the second region is provided with a rounded corner.

Optionally, the second metal mesh layer further includes: one or more dummy electrodes disposed on the first electrode.

Optionally, the carrier layer is made from SiNx or SiOx; or, the carrier layer is a transparent glass layer.

Optionally, the second electrode and the second touch unit are coupled through a via hole.

Optionally, one end of the via hole is disposed at an intersection of two metal wires of the first metal mesh layer, and the other end of the via hole is disposed at an intersection of two metal wires of the second metal mesh layer.

Optionally, the touch module further includes: a protective layer disposed on a side, distal from the carrier layer, of the second metal mesh layer.

Optionally, the protective layer is made from an organic material.

In another aspect, a touch display screen is provided. The touch display screen includes a display screen and the touch module as described in the above aspect.

In still another aspect, an electronic device is provided. The electronic device includes a power supply assembly and the touch display screen as described in the above aspect;
 wherein the power supply assembly is coupled to the touch display screen and configured to supply power to the touch display screen.

BRIEF DESCRIPTION OF THE DRAWINGS

The above-described and/or additional aspects and advantages of the present disclosure will become apparent and easy to understand from the following descriptions of embodiments with reference to the accompanying drawings, in which.

Reference numbers in FIGS. 1-9 are: 1—carrier layer; 2—first metal mesh layer; 21—third region; 211—second electrode; 3—insulating layer; 4—second metal mesh layer; 41—first region; 411—touch unit; 42—second region; 421—first electrode; 4211—dummy electrode; 5—via hole; 6—protective layer; 00—display screen; 01—touch module; 000—electronic device; J1—power supply assembly.

DETAILED DESCRIPTION

To further illustrate the technical means and effects adopted by the present disclosure to achieve the intended invention objectives, the specific implementations, structure, features and effects of the touch module, touch display screen and electronic device provided by the present disclosure are described in detail below with reference to the accompanying drawings and optional embodiments. The terms "first", "second", "third" and the like used in following descriptions do not denote any order, quantity, or importance, but are merely used to distinguish different components. Similarly, the term "one", "a/an", or the like is not intended to limit the quantity, but denote the existence of at least one. The term "comprise", "include", or the like is intended to mean that element or item preceding the term includes the elements or items listed after the term and their equivalents, without excluding other elements or items. The term "coupling", "connecting" or the like is not limited to physical or mechanical coupling but may include electrical coupling, which may be direct or indirect. The terms "upper", "lower", "left", "right" and the like are only used to indicate the relative positional relationship, and the relative positional relationship may change accordingly when the absolute position of a described object changes. The term "and/or" indicates that there may be three kinds of relationships. For example, A and/or B, can be expressed as: A exists alone; A and B exist concurrently; and B exists alone. The character "/" generally indicates that the context object is an "OR" relationship.

At present, in a touch display screen with holes or arc-shaped corners, the area of the touch unit disposed at the hole or arc-shaped corner is much smaller than the area of the touch unit disposed at other positions. Correspondingly, the capacitive signal intensity of the touch unit at the hole or the arc-shaped corner is relatively low. As a result, the touch accuracy at the hole or arc-shaped corner is poor, which severely affects user experience.

An embodiment of the present disclosure provides a touch module. In a touch display screen including the touch module, the touch accuracy at any position is excellent, which effectively improves the user experience.

Figure 1:
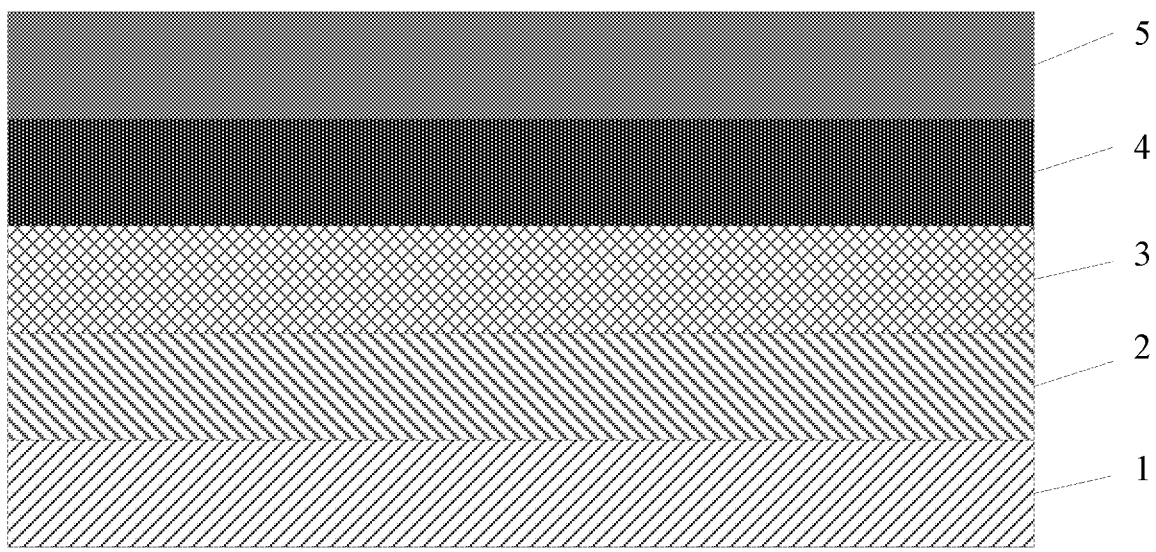
FIG. 1 is a schematic structural diagram of a touch module according to an embodiment of the present disclosure.
Figure 2:
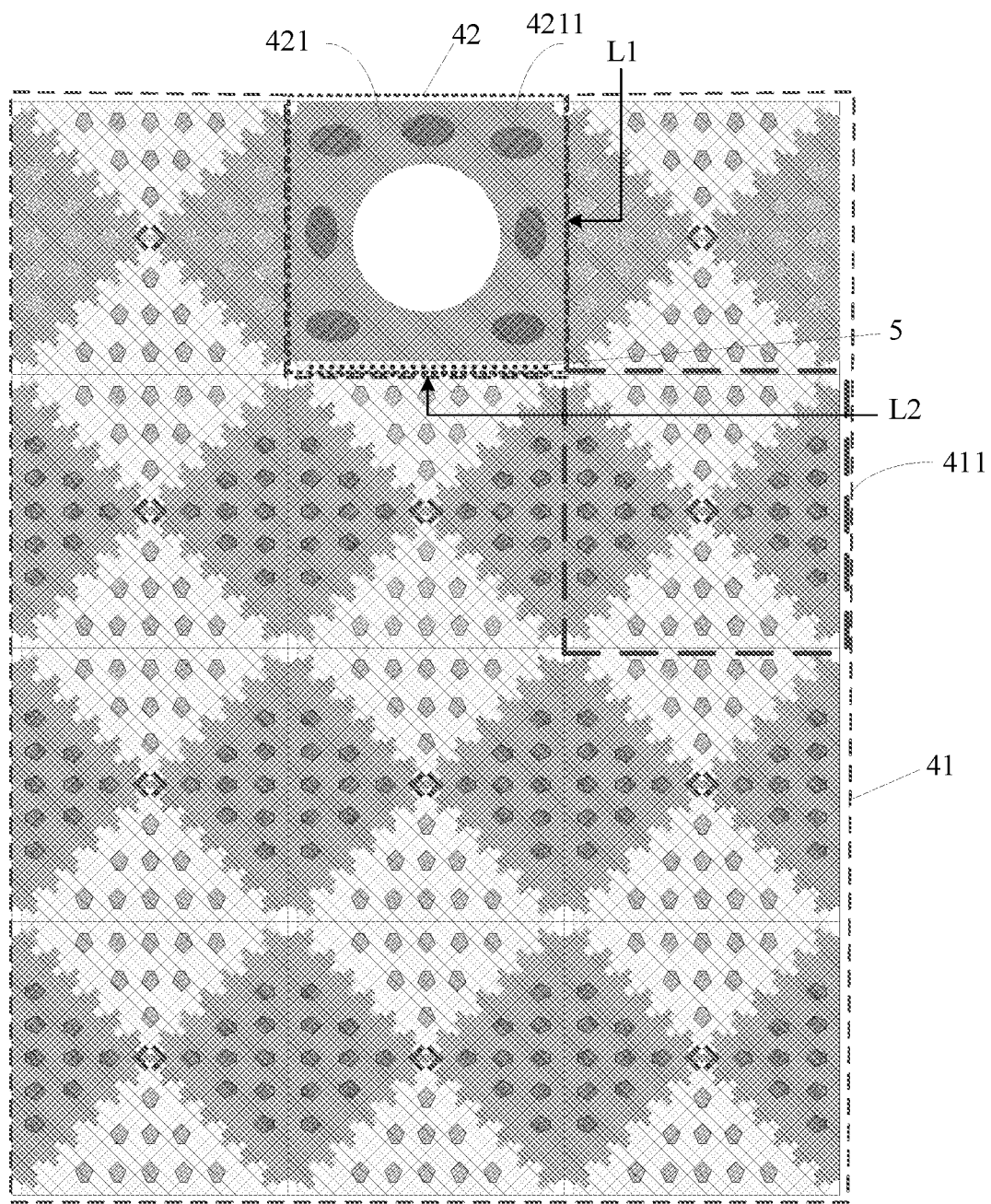
FIG. 2 is a schematic structural diagram of a second metal mesh layer of a touch module according to an embodiment of the present disclosure.
Figure 3:
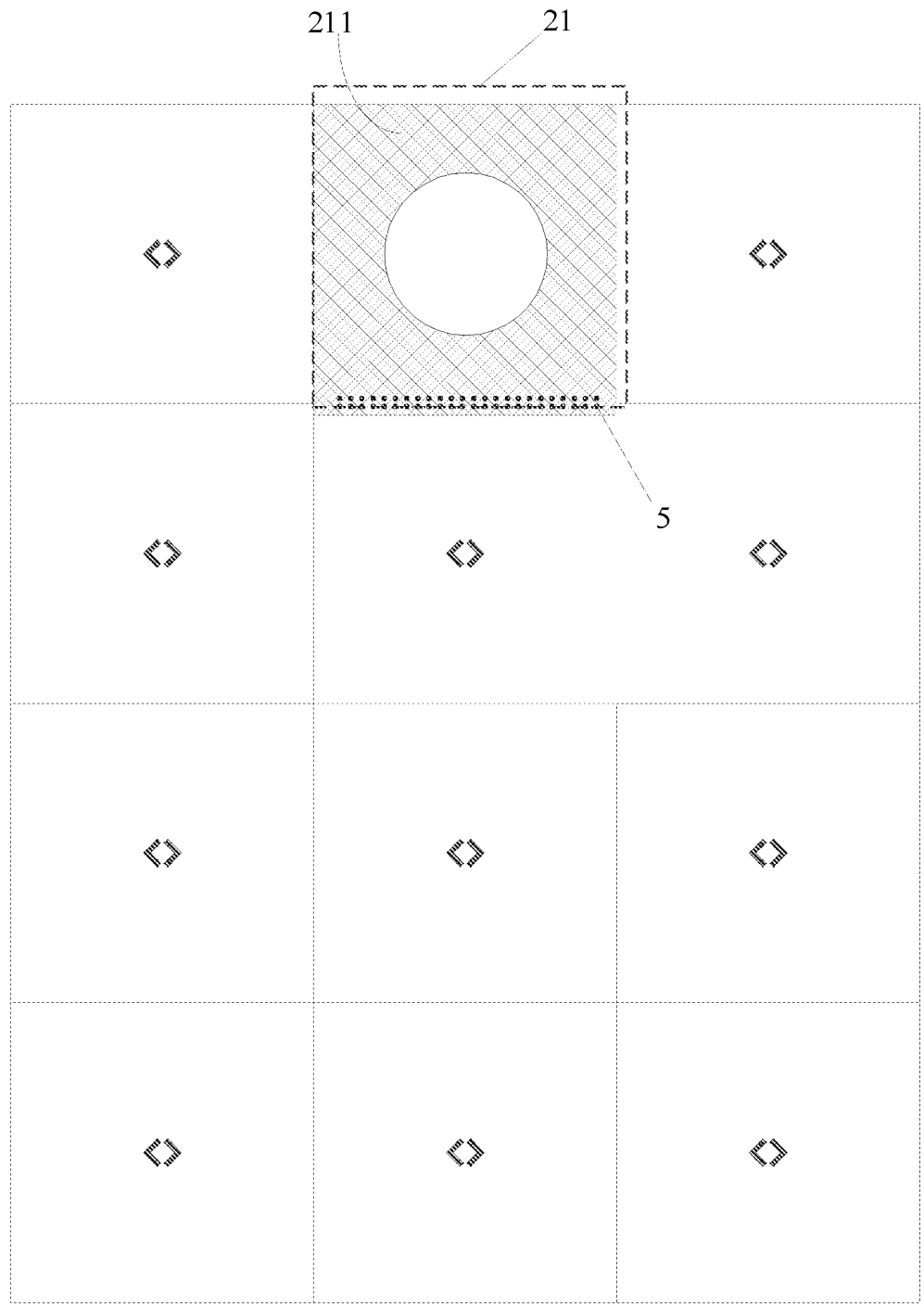
FIG. 3 is a schematic structural diagram of a first metal mesh layer of a touch module according to an embodiment of the present disclosure.

FIG. 1 is a schematic structural diagram of a touch module according to an embodiment of the present disclosure. As shown in FIG. 1, the touch module includes a carrier layer 1, a first metal mesh layer 2, an insulating layer 3 and a second metal mesh layer 4 that are sequentially laminated. In combination with FIG. 1, FIG. 2 shows a structure of a second metal mesh layer 4, and FIG. 3 shows a structure of a first metal mesh layer 2. The touch module is generally disposed at a side of a display screen for users to touch.

Referring to FIG. 2, it can be seen that the second metal mesh layer 4 provided by the embodiment of the present disclosure is provided with a first region 41 and a second region 42. That is, the second metal mesh layer 4 includes the first region 41 and the second region 42. The second metal mesh layer 4 includes a plurality of touch units 411 disposed in the first region 41, and a first electrode 421 disposed in the second region 42. That is, a plurality of touch units 411 are formed in the first region 41, and the first electrode 421 is formed in the second region 42. The first electrode 421 may be coupled to a first touch unit of the plurality of touch units 411, and the first touch unit is adjacent to a first side L1 of the second region 42. That is, the first electrode 421 is coupled to the touch unit 411 adjacent to one side of the second region 42. Coupling may refer to an electrical connection.

Referring to FIG. 3, it can be seen that the first metal mesh layer 2 provided by the embodiment of the present disclosure is provided with a third region 21, and an orthographic projection of the third region 21 on the carrier layer 1 is overlapped with an orthographic projection of the second region 42 on the carrier layer 1. The first metal mesh layer 2 includes a second electrode 211 disposed in the third region 21, that is, the second electrode 211 is formed in the third region 21. The second electrode 211 is coupled to a second touch unit of the plurality of touch units 411, and the second touch unit is adjacent to a second side L2 of the second region 42. That is, the second electrode 211 is coupled to the touch unit 411 adjacent to another side of the second region 42.

The first electrode 421 disposed in the second region 42 and the second electrode 211 disposed in the third region 21 may be configured to form a target touch unit for users to touch.

Since the first electrode 421 and the second electrode 211 belong to the different metal mesh layers, the capacitive signal intensity of the target touch unit formed of the first electrode 421 and the second electrode 211 is relatively large, and the touch accuracy at the target touch unit is relatively high. Based on this, an orthographic projection of the second region 42 on the display screen and an orthographic projection of the third region 31 on the display screen may be set to be at the hole formed in the display screen or the arc-shaped corner of the display screen, to effectively improve the touch accuracy and the touch sensitivity at the hole or the arc-shaped corner of the display screen.

In addition, compared with the traditional conductive layer made from indium tin oxide (ITO), the conductive layer using metal meshes not only is thinner, but also makes the resistance of the finally formed touch unit lower. That is, the touch unit formed by using the metal mesh layers has an excellent conductive effect and touch effect. In other words, the metal meshes may replace the traditional ITO conductive layer, and using the metal meshes as the electrodes may make the resistance lower and the conductive layer or an electrode layer thinner. Therefore, the touch unit 411 formed of the first metal mesh layer 2 may have an excellent conductive effect and touch effect.

Optionally, the carrier layer 1 may be a buffer layer that can be directly molded on the surface of the display screen. The insulating layer 3 may be a film layer capable of insulating and isolating the first metal mesh layer 2 from the second metal mesh layer 4. The material of the insulating layer may be selected according to actual needs, which is not specifically limited in the embodiments of the present disclosure.

In summary, the embodiment of the present disclosure provides a touch module. The touch module includes the carrier layer, the first metal mesh layer, the insulating layer and the second metal mesh layer that are laminated. The first metal mesh layer includes the second electrode disposed in the third region; the second metal mesh layer includes the first electrode disposed in the second region; and the third region is overlapped with the second region. In this way, the capacitive signal intensity of the touch unit formed of the first electrode and the second electrode is relatively large. On this basis, by disposing the second region and the third region to be at the position corresponding to the hole or the arc-shaped corner of the display screen, the touch accuracy and the touch sensitivity at these positions can be effectively improved.

Optionally, referring to FIG. 2, the plurality of touch units 411 in the first region 41 may be arranged in a matrix. Each touch unit 411 may include a sensing electrode and a driving electrode. The sensing electrodes in the plurality of touch units 411 may be coupled and conducted by coupling bridges. Similarly, the driving electrodes in the plurality of touch units 411 may also be coupled and conducted by coupling bridges. The structure and arrangement position of the coupling bridge are well known by technical persons. In addition, the shapes of the sensing electrodes and the driving electrodes of the touch units 411 may be set as required, which is not specifically limited in the embodiments of the present disclosure.

In the embodiments of the present disclosure, the first electrode 421 may be coupled to one of the sensing electrode and the driving electrode of the first touch unit, and the second electrode 211 may be coupled to the other of the sensing electrode and the driving electrode of the second touch unit. That is, the second electrode 211 is coupled to the driving electrode of the second touch unit when the first electrode 421 is coupled to the sensing electrode of the first touch unit. In other words, the first electrode 421 serves as the sensing electrode and the second electrode 211 serves as the driving electrode, so as to form a target touch unit. The second electrode 211 is coupled to the sensing electrode of the second touch unit when the first electrode 421 is coupled to the driving electrode of the first touch unit, that is, the first electrode 421 serves as the driving electrode and the second electrode 211 serves as the sensing electrode, so as to form a target touch unit.

Optionally, referring to FIG. 2, the second metal mesh layer 4 described in the embodiment of the present disclosure may further include one or more dummy electrodes 4211 disposed on the first electrode 421. The quantity of the dummy electrodes 4211 may be set according to design and use requirements.

Optionally, the shape of each dummy electrode 4211 may be set according to use requirements. For example, the dummy electrodes may all be oval as shown in FIG. 2, or in other shapes, such as a rhombus.

Optionally, in combination with FIG. 2, the first electrode 421 may be directly coupled to the first touch unit. Therefore, there is no need to set an additional signal coupling wire in the second region 42. That is, there is no need to provide an additional signal coupling wire for coupling the second region 42 to the first touch unit in the first region 41. In this way, the hole of the display screen may be designed to be frameless. In addition, the display screen is prevented from cracks caused by cutting at the hole position, thereby avoiding poor touch caused by local breakage of a touch control channel.

Optionally, in combination with FIGS. 2 and 3, the second electrode 211 and the second touch unit may be coupled through a via hole 5. The way of forming the via hole 5 is well known by technical persons.

Both the first metal mesh layer 2 and the second metal mesh layer 4 may be of a mesh structure formed of a plurality of metal wires which are intersected. One end of the via hole 5 may be disposed at an intersection of two metal wires of the first metal mesh layer 2, and the other end of the via hole 5 may be disposed at an intersection of two metal wires of the second metal mesh layer 4. That is, one end of the via hole 5 may correspond to the intersection of the two metal wires of the first metal mesh layer 2, and the other end of the via hole 5 may correspond to the intersection of the two metal wires of the second metal mesh layer 4.

Optionally, in combination with FIG. 3, a plurality of via holes 5 may be provided, and the plurality of via holes 5 may be arranged in a suitable manner according to design requirements, for example, arranged in a matrix as shown in the figure.

Optionally, the first side L1 and the second side L2 may be two adjacent sides of the second region 42. That is, referring to FIGS. 2 and 3, the first touch unit coupled to the first electrode 421 and the second touch unit coupled to the second electrode 211 may be disposed on the right side and lower side of the rectangular second region 42 which are adjacent, respectively.

Certainly, in some embodiments, the first side L1 and the second side L2 may not be adjacent to each other. For example, in combination with FIGS. 2 and 3, the first touch unit coupled to the first electrode 421 and the second touch unit coupled to the second electrode 211 may be disposed on the left side and right side of the rectangular second region 42, respectively.

Optionally, the orthographic projection of the third region 21 on the carrier layer 1 and the orthographic projection of the second region 42 on the carrier layer 1 may coincide with each other. That is, the second region 42 of the first metal mesh layer 2 and the third region 21 of the second metal mesh layer 4 correspond to each other and are of the same shape and size. Thus, it's ensured that the first electrode 421 disposed in the second region 42 and the second electrode 211 disposed in the third region 21 have a bigger opposing area, which further ensures the large capacitive signal intensity of the target touch unit formed of the first electrode 421 and the second electrode 211, and improves the touch accuracy and the touch sensitivity of the display screen.

Optionally, the shape of the second region 42 and the shape of the third region 21 may be determined based on the corresponding position on the display screen. For example, when the second region 42 and the third region 21 correspond to the hole of the display screen, referring to FIGS. 2 and 3, both the second region 42 and the third region 21 may be of a rectangle with the middle hollowed out, and an orthographic projection of the hollowed-out portion in the middle of the second region 42 on the carrier layer 1 and an orthographic projection of the hollowed-out portion in the middle the third region 21 on the carrier layer 1 may be overlapped and correspond to the hole of the display screen. That is, when the second region 42 and the third region 21 correspond to the rounded corner of the display screen, the second region 42 and the third region 21 are arc-shaped.

Optionally, the orthographic projection of the hollowed-out portion in the middle of the second region 42 on the carrier layer 1 and the orthographic projection of the hollowed-out portion in the middle of the third region 21 on the carrier layer 1 may coincide with each other. The hollowed-out portion in the middle of the second region 42 and the hollowed-out portion in the middle of the third region 21 are of the same shape and size, and mutually run through to the hole.

Optionally, the shapes of the hollowed-out portions in the middles may be the same as the shape of the hole of the display screen, for example, they are all circular as shown in FIGS. 2 and 3. Certainly, in some embodiments, the shapes of the hollowed-out portions may also be in other shapes, such as oblong and rhombus. In this case, it may be understood that the second region 42 is in the shape of a hollowed-out ring, and the shape of the third region 21 is the same as the shape of the second region 42.

Figure 4:
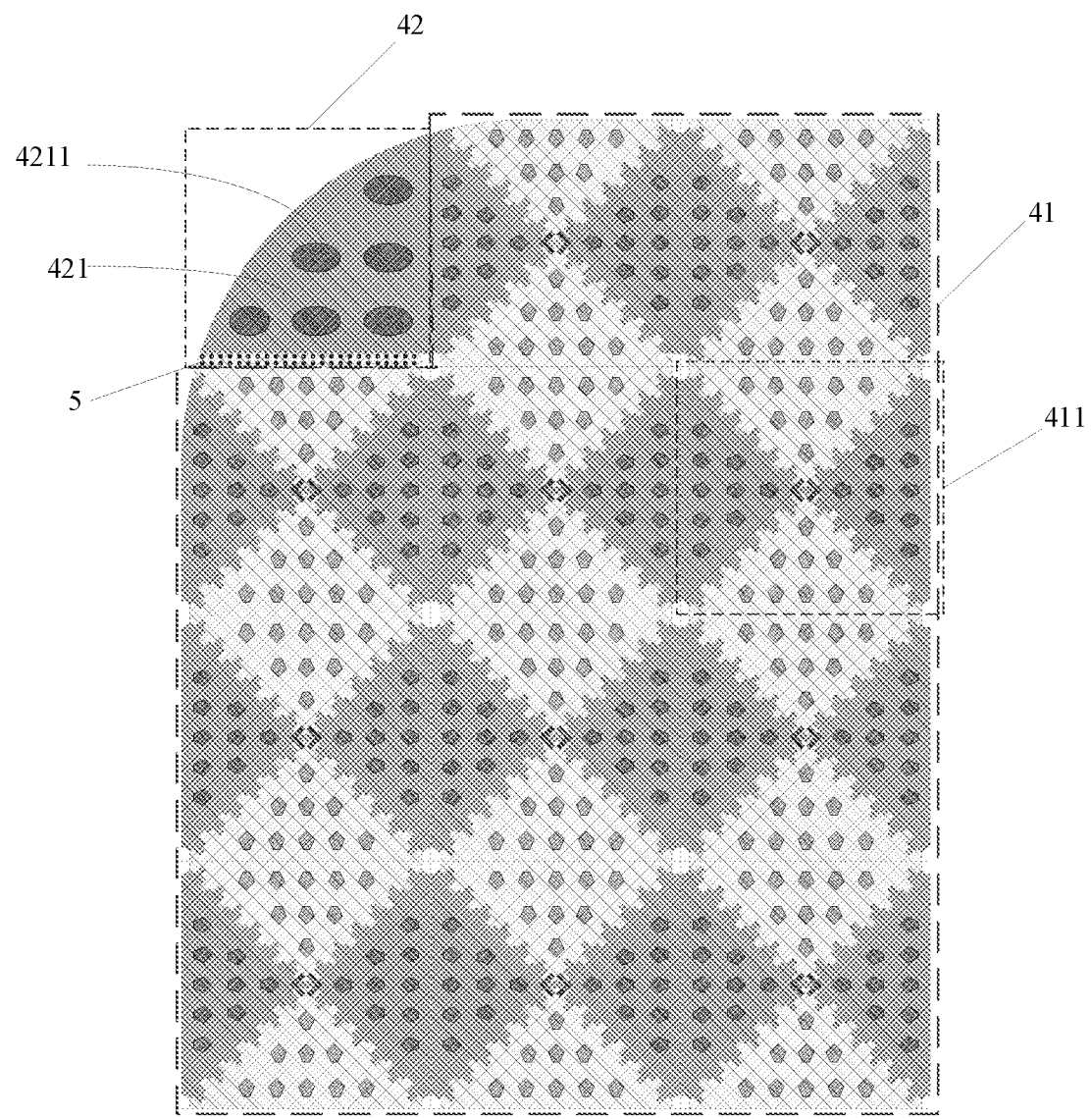
FIG. 4 is a schematic structural diagram of a second metal mesh layer of another touch module according to an embodiment of the present disclosure.
Figure 5:
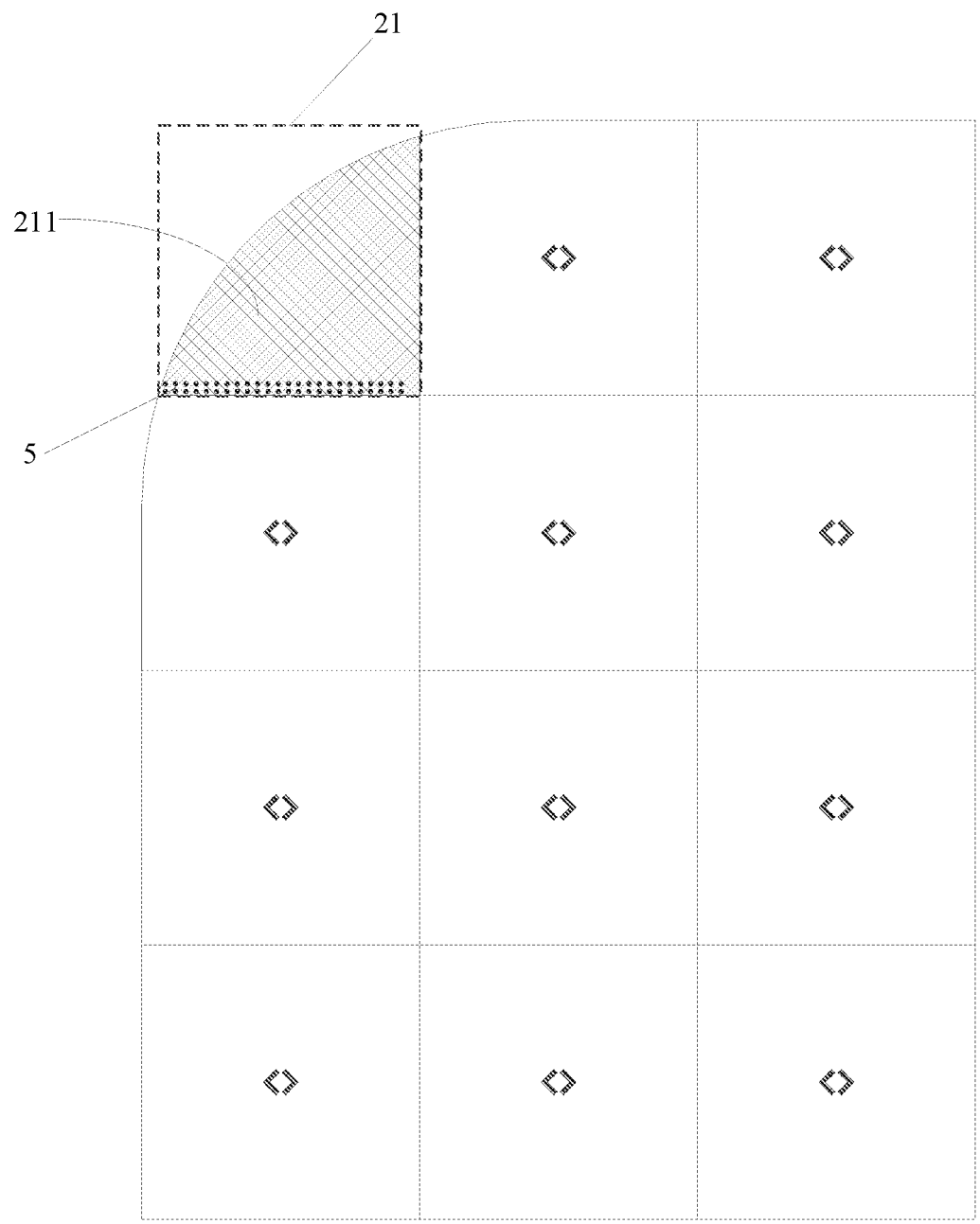
FIG. 5 is a schematic structural diagram of a first metal mesh layer of another touch module according to an embodiment of the present disclosure.

For another example, when the second region 42 and the third region 21 correspond to the arc-shaped corner of the display screen, referring to FIGS. 4 and 5, both the second region 42 and the third region 21 have a rounded corner, and the rounded corner coincides with the arc-shaped corner of the display screen. That is, the second region 42 may also be in the shape of a rounded corner, for corresponding to the rounded corner of the display screen.

Optionally, the orthographic projection of the first electrode 421 on the carrier layer 1 and the orthographic projection of the second region 42 on the carrier layer 1 may coincide with each other, and the orthographic projection of the second electrode 211 on the carrier layer 1 and the orthographic projection of the third region 21 on the carrier layer 1 may coincide with each other. That is, the first electrode 421 may occupy the entire second region 42 of the first metal mesh layer 2, and the second electrode 211 may also occupy the entire third region 21 of the second metal mesh layer 4, which can ensure a large capacitive signal intensity of the target touch unit formed of the first electrode 421 and the second electrode 211, and ensure the touch accuracy and the touch sensitivity.

When the second region 42 and the third region 21 are provided with the hollowed-out portions corresponding to the hole of the display screen, since the second region 42 and the third region 21 correspond to each other and are of the same shape and size, the second region 42 is mainly used for describing the area and the corresponding position of the display screen. In the case that the second region 42 is not provided, the touch units 411 need to occupy the entire first metal mesh layer 2. In addition, in consideration of the electrical connection among the touch units 411 and the coupling between the first electrode 421 and the touch unit 411, the size of the second region 42 may be described by using the quantity of the occupied touch units 411.

The second region 42, the third region 21, the first electrode 421 and the second electrode 211 are described as follows by taking an example in which the orthographic projection of the second region 42 on the carrier layer 1 and the orthographic projection of the third region 21 on the carrier layer 1 coincide with each other.

As an optional implementation, the size of the second region 42 may be the same as the size of the region occupied by one touch unit 411 in the first region 41, and the shape of the second region 42 may be the same as the shape of the region occupied by one touch unit 411 in the first region 41. On this basis, the second metal mesh layer 4 may include one first electrode 421 disposed in the second region 42, and the quantity of the second electrodes 21 in the first metal mesh layer 2 may equal the quantity of the first electrodes 421 in the second metal mesh layer 4. That is, the first metal mesh layer 2 may also include one second electrode 211.

As another optional implementation, the size of the second region 42 may be the same as the size of the region occupied by a plurality of touch units 411 in the first region 41, and the shape of the second region 42 may be the same as the shape of the region occupied by the plurality of touch units 411 in the first region 41. On this basis, the second metal mesh layer 4 may include one or more first electrodes 421 disposed in the second region 42, and the quantity of the second electrodes 21 in the first metal mesh layer 2 may equal the quantity of the first electrodes 421 in the second metal mesh layer 4. That is, the first metal mesh layer 2 may also include one or more second electrodes 211.

Certainly, in the scenario of the another optional implementation, in some embodiments, the quantity of the second electrodes 211 in the first metal mesh layer 2 and the quantity of the first electrodes 421 in the second metal mesh layer 4 may be unequal. For example, the second metal mesh layer 4 may include one first electrode 421 disposed in the second region 42, while the first metal mesh layer 2 includes two second electrodes 211 disposed in the third region 21. Alternatively, the second metal mesh layer 4 may include two first electrodes 421 disposed in the second region 42, while the first metal mesh layer 2 includes one second electrode 211 disposed in the third region 21.

For example, the foregoing two optional implementations are described by taking the hollowed-out portions in the middles of the second region 42 and the third region 21 and hollowed-out portions corresponding to the hole of the display screen as an example.

In the case that the second region 42 is not provided, the touch units 411 need to occupy the entire first metal mesh layer 2, i.e., the entire first metal mesh layer 2 includes only a plurality of touch units 411 but not any other electrodes, and the regions occupied by the touch units 411 are of the same shape and size. Meanwhile, in consideration of the electrical connection among the touch units 411 and the coupling between the first electrode 421 and the first touch unit, the size of the second region 42 described below may be described by using the quantity of the occupied regions of the touch units 411.

As described in the above embodiments, there may be two cases for the second region 42. One case is that the second region 42 occupies the region of one touch unit 411 as shown in FIGS. 2 and 3. In this case, as shown in FIG. 2, only one first electrode 421 is provided, and the first electrode 421 is coupled to one first touch unit. As shown in FIG. 3, only one second electrode 211 is provided, and the second electrode 211 is coupled to one second touch unit through the via hole 5. It can be seen from the figures that the second region 42 has a relatively small area in this case, and the area of the first electrode 421 may be effectively increased by disposing one complete first electrode 421 in the second region 42. Similarly, the third region 21 also has a relatively small area, and the area of the second electrode 211 may be effectively increased by disposing one complete second electrode 211 in the third region 21. In this way, the capacitive signal intensity of the target touch unit formed of the first electrode 421 and the second electrode 211 can be increased, thereby improving the touch sensitivity.

Figure 6:
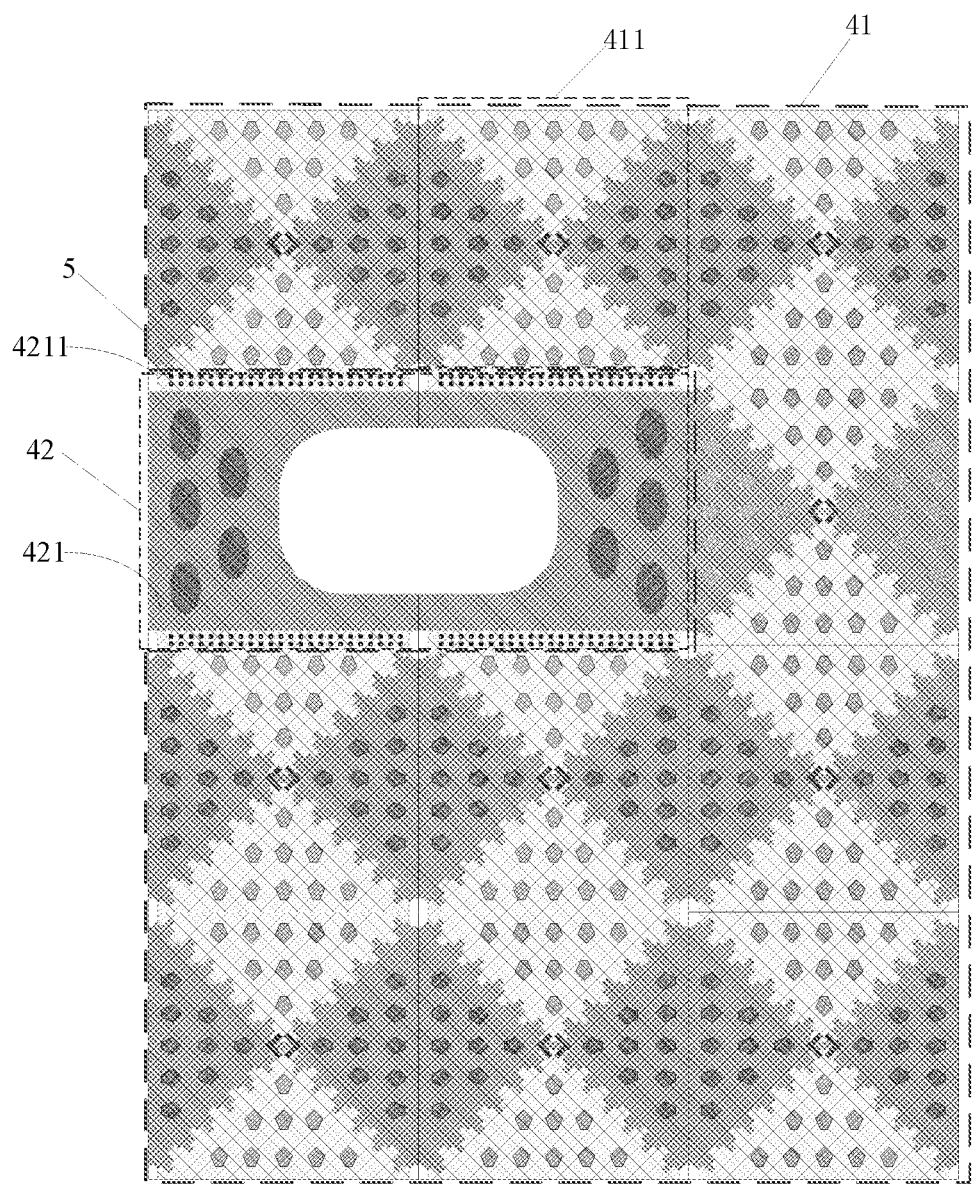
FIG. 6 is a schematic structural diagram of a second metal mesh layer of yet another touch module according to an embodiment of the present disclosure.
Figure 7:
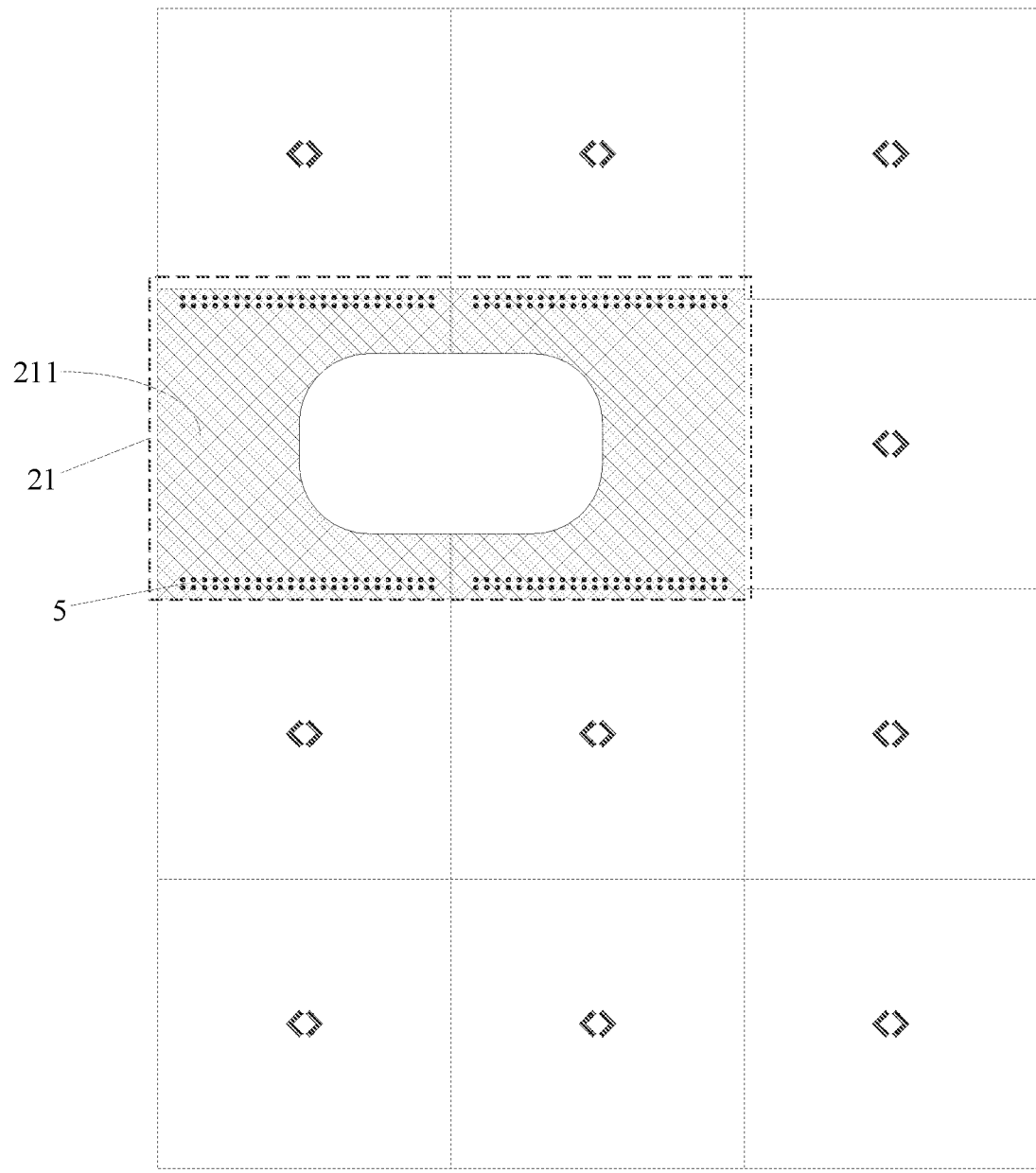
FIG. 7 is a schematic structural diagram of a first metal mesh layer of yet another touch module according to an embodiment of the present disclosure.

The other case is that the second region 42 occupies the region of two touch units 411, as shown in FIGS. 6 and 7. In this case, it can be seen from FIG. 6 that the area of the second region 42 is larger than that in FIG. 2. In this case, two second electrodes 421 may be provided, and the two second electrodes 421 are respectively coupled in one-to-one correspondence to two first touch units disposed on different sides of the second region 42. Two second electrodes 211 may be provided, and the two second electrodes 211 are respectively coupled in one-to-one correspondence to two second touch units disposed on different sides of the second region 42 through the via holes 5. Alternatively, two first electrodes 421 may be provided, and the two first electrodes 421 are respectively coupled in one-to-one correspondence to two first touch units disposed on different sides of the second region 42; while, one second electrode 211 may be provided, and the second electrode 211 is coupled to one second touch unit through the via hole 5. Alternatively, one first electrode 421 may be provided, and the second electrode 421 is coupled to one first touch unit; while two second electrodes 211 may be provided, and the two second electrodes 211 are respectively coupled in one-to-one correspondence to the two second touch units disposed on different sides of the second region 42 through the via holes 5.

It should be noted that from the descriptions of the above embodiments, the quantity of the first electrodes 421 in the second metal mesh layer 4 may equal the quantity of the regions of the touch units occupied by the second region 41.

Optionally, in consideration that the hole is formed in the display screen and the touch units 411 usually need to be arranged in a matrix, the second region 42 may occupy two or more touch units 411 in one row or two or more touch units 411 in one column, as shown in FIG. 6.

For example, the foregoing two optional implementations are described by taking an example in which the second region 42 and the third region 21 are provided with a rounded corner and the rounded corner corresponds to the arc-shaped corner of the display screen.

For the size of the second region 42, reference may be made to the above descriptions of the second region corresponding to the hole of the display screen. That is, the second region 42 may have a relatively small area, and occupy the region of only one touch unit 411; or the second region 42 may have a relatively large area, and for example occupy the regions of a plurality of touch units 411.

As shown in FIGS. 4 and 5, when the second region 42 occupies the region of one touch unit 411, only one first electrode 421 may be provided, and the first electrode 421 is coupled to one first touch unit; and only one second electrode 211 may be provided, and the second electrode 211 is coupled to the second touch unit through the via hole 5.

Figure 8:
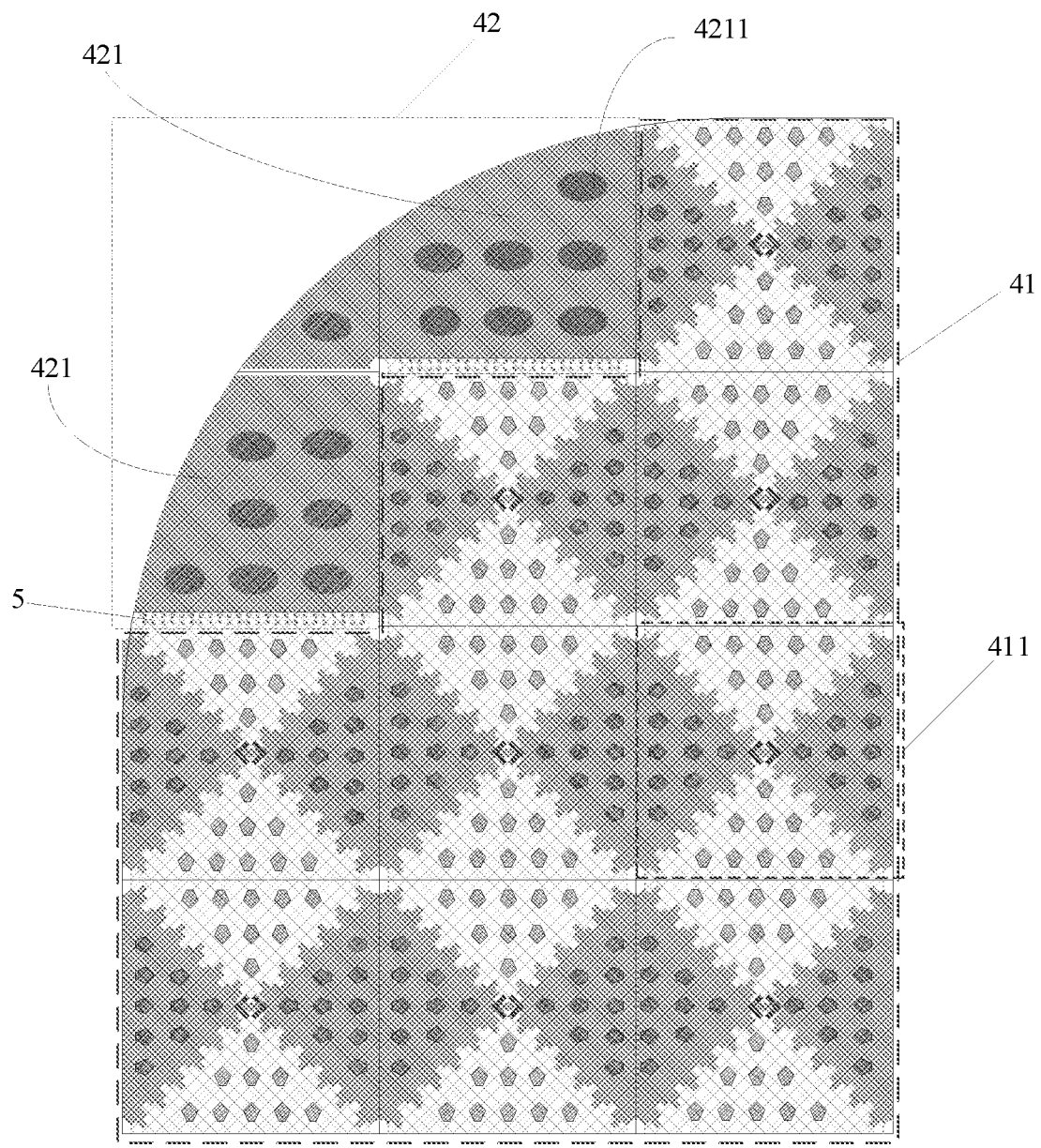
FIG. 8 is a schematic structural diagram of a second metal mesh layer of still yet another touch module according to an embodiment of the present disclosure.
Figure 9:
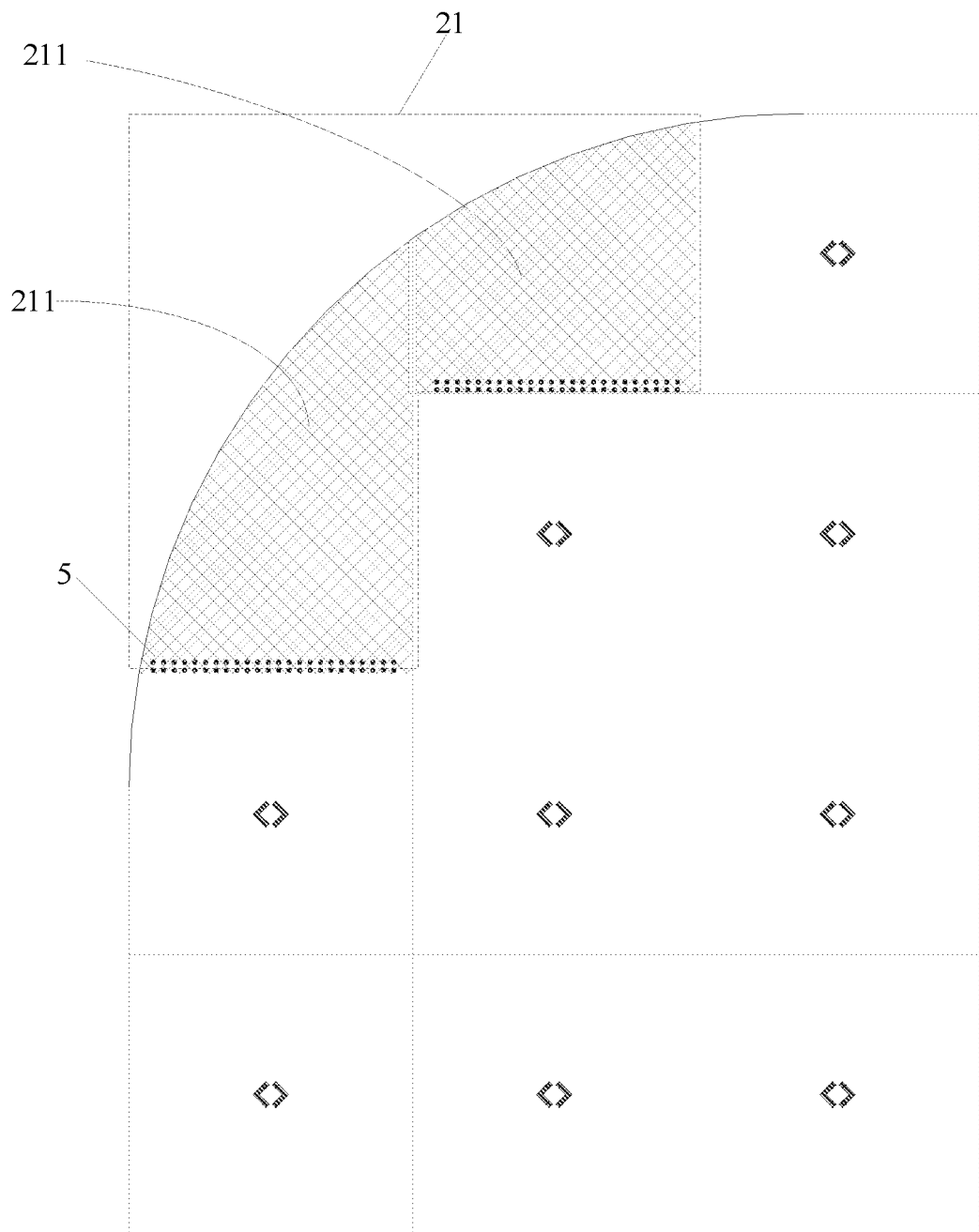
FIG. 9 is a schematic structural diagram of a first metal mesh layer of still yet another touch module according to an embodiment of the present disclosure.

As shown in FIGS. 8 and 9, when the second region 42 occupies the regions of two touch units 411, two first electrodes 421 may be provided correspondingly, and the two first electrodes 421 are respectively coupled in one-to-one correspondence to two first touch units disposed on different sides of the second region 42. Two second electrodes 211 may be provided correspondingly, and the two second electrodes 211 are respectively coupled in one-to-one correspondence to two second touch units disposed on different sides of the second region 42 through the via holes 5. For detailed analysis of the principle, reference may be made to the descriptions of the second region 42 corresponding to the hole of the display screen.

Figure 10:
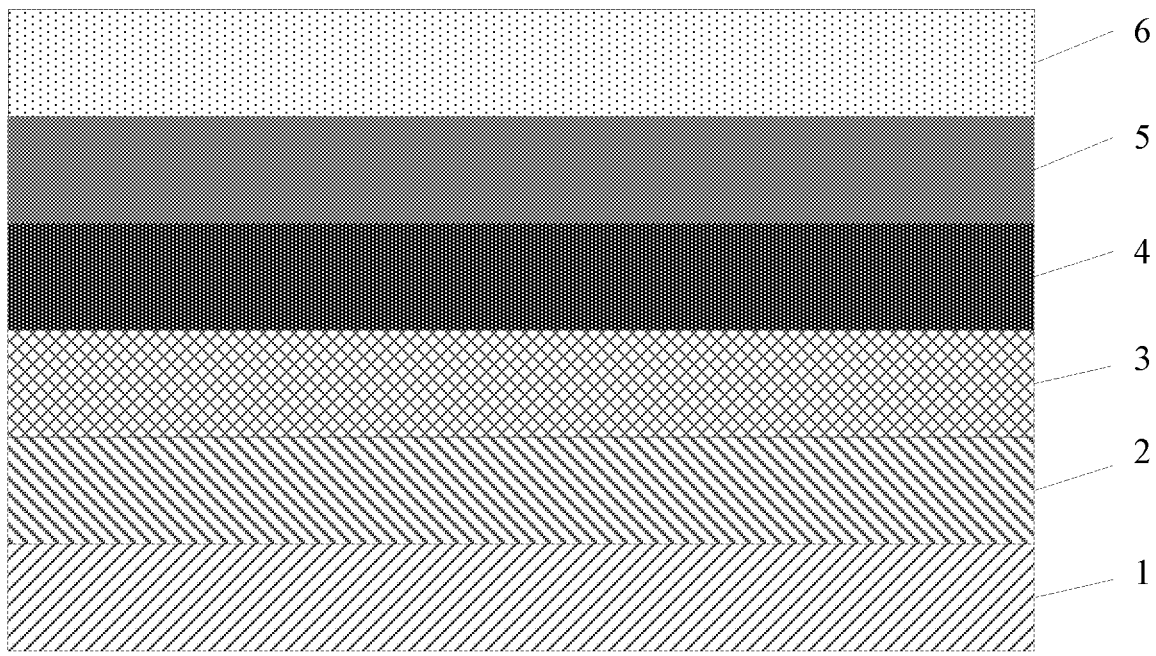
FIG. 10 is a schematic structural diagram of another touch module according to an embodiment of the present disclosure.

Optionally, referring to FIG. 10, the touch module in the embodiments of the present disclosure may further include a protective layer 6 disposed on the side of the second metal mesh layer 4 distal from the carrier layer 1. The protective layer 6 is a waterproof, dustproof, insulating and reinforced film layer.

The material of the protective layer 6 may be selected according to actual needs. For example, the protective layer 6 may be made from an organic material, i.e., the protective layer 6 may be an organic film layer.

Optionally, the carrier layer 1 may be made from silicon nitride (SiNx) or silicon oxide (SiOx), i.e., the carrier layer 1 may be a film layer made from SiNx/SiOx. In this case, the touch module may be directly formed on a light-exiting side of the display screen by conventional technical means such as evaporation, exposure and etching, and forms a touch display screen with a touch function together with the display screen.

Alternatively, the carrier layer 1 may be a transparent glass layer. In this case, the touch module may be molded individually. That is, the transparent glass layer may be used as a substrate, and the first metal mesh layer 2, the insulating layer 3, the second metal mesh layer 4 and the protective layer 6 may be sequentially laminated on the substrate through an existing lamination process. The formed touch module may be combined with the display screen by a full-bonding process to form a touch display screen with a touch function.

The touch module provided in the technical solution of the present disclosure is provided with the first metal mesh layer 2 and the second metal mesh layer 4. The plurality of touch units 411 disposed in the first region 41 of the second metal mesh layer 4 may correspond to the surface of the display screen for achieving a touch function of the surface of the display screen, and the second region 42 may be disposed at the rounded corner of the display screen; and/or, a hollowed-out portion facing the hole of the display screen is provided in the second region 42, that is, the second region 42 faces the hole of the display screen. In this way, by setting the second region 42 as the first electrode 421, and setting the third region 21 corresponding to the second region 42 and disposed in the first metal mesh layer 2 as the second electrode 211, it's ensured that the touch unit 411 formed of the first electrode 421 and the second electrode 211 may have a large capacitive signal intensity, which can improve the touch sensitivity at the hole and the rounded corner of the display screen corresponding to the second region 42.

In addition, as described above, in the touch module provided by the embodiments of the present disclosure, there is no need to provide an additional signal coupling wire in the second region 42 corresponding to the hole of the display screen, that is, there is no need to provide an additional signal coupling wire by which the second region 42 is coupled to the touch unit 411 in the first region 41. Therefore, the hole of the display screen may be designed to be frameless. Moreover, since there is no need to provide a signal coupling wire, the panel is prevented from cracks caused by cutting at the hole position, thereby avoiding poor touch caused by local breakage of the touch control channel.

In summary, the embodiment of the present disclosure provides a touch module. The touch module includes the carrier layer, the first metal mesh layer, the insulating layer and the second metal mesh layer that are laminated. The first metal mesh layer includes the second electrode disposed in the third region; the second metal mesh layer includes the first electrode disposed in the second region; and the third region is overlapped with the second region. In this way, the capacitive signal intensity of the touch unit formed of the first electrode and the second electrode is relatively large. On this basis, by disposing the second region and the third region to be at the position corresponding to the hole or the arc-shaped corner of the display screen, the touch accuracy and the touch sensitivity at these positions can be effectively improved.

Figure 11:
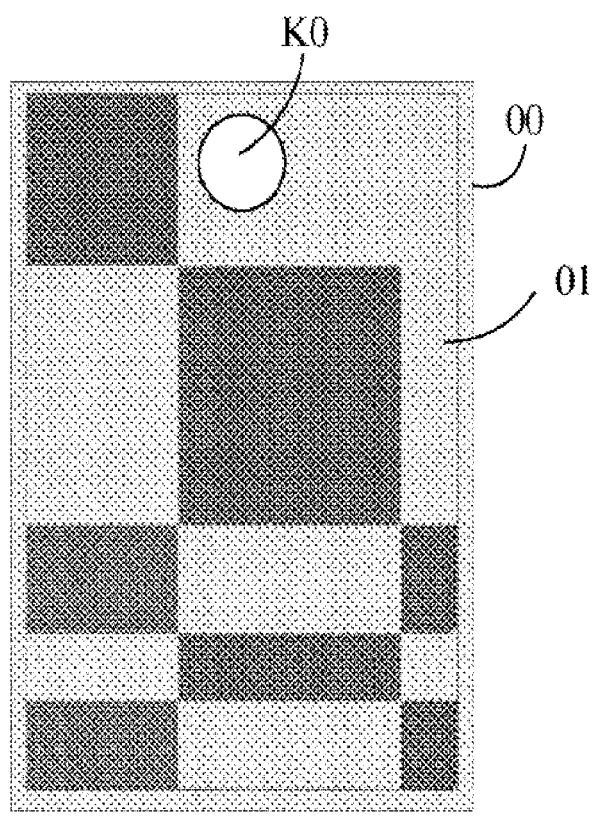
FIG. 11 is a schematic structural diagram of a touch display screen according to an embodiment of the present disclosure.

FIG. 11 is a schematic structural diagram of a touch display screen according to an embodiment of the present disclosure. As shown in FIG. 11, the touch display screen may include a display screen 00, and the touch module 01 as shown in any one of FIGS. 1 to 10.

The touch module 01 may be disposed at a side of the display screen 00.

The touch module includes a carrier layer 1, a first metal mesh layer 2, an insulating layer 3, a second metal mesh layer 4 and a protective layer 5 that are sequentially laminated. The second metal mesh layer 4 includes a first region 41 and a second region 42. A plurality of touch units 411 are formed in the first region 41, a first electrode 421 is formed in the second region 42, a dummy electrode 4211 is disposed in the first electrode 421, and the first electrode 421 is coupled to the touch unit 411 adjacent to one side of the second region 42. The first metal mesh layer 2 is provided with a third region 21, and the third region 21 and the second region 42 correspond to each other and are of the same shape and size. A second electrode 211 is formed in third region 21, and the second electrode 211 is coupled to the touch unit 411 adjacent to another side of the second region 42 through a via hole 5. The first electrode 421 and the second electrode 211 form a touch unit 411.

Specifically, the touch module in this embodiment may directly adopt the touch module provided in the above embodiment, and reference may be made to the related contents described in the above embodiment for the specific implementing structure, which is not repeated herein.

The touch module provided in the technical solution of the present disclosure is provided with the first metal mesh layer 2 and the second metal mesh layer 4. The plurality of touch units 411 disposed in the first region 41 of the second metal mesh layer 4 may correspond to the surface of the display screen for achieving a touch function of the surface of the display screen, and the second region 42 may be disposed at the rounded corner of the display screen; and/or, a hollowed-out portion facing the hole of the display screen is provided in the second region 42, that is, the second region 42 faces the hole of the display screen. In this way, by setting the second region 42 as the first electrode 421, and setting the third region 21 corresponding to the second region 42 and disposed in the first metal mesh layer 2 as the second electrode 211, it's ensured that the touch unit 411 formed of the first electrode 421 and the second electrode 211 may have a large capacitive signal intensity, which can improve the touch sensitivity at the hole and the rounded corner of the display screen corresponding to the second region 42.

In addition, as described above, in the touch module provided by the embodiments of the present disclosure, there is no need to provide an additional signal coupling wire in the second region 42 corresponding to the hole of the display screen, that is, there is no need to provide an additional signal coupling wire by which the second region 42 is coupled to the touch unit 411 in the first region 41. Therefore, the hole of the display screen may be designed to be frameless. Moreover, since there is no need to provide a signal coupling wire, the panel is prevented from cracks caused by cutting at the hole position, thereby avoiding poor touch caused by local breakage of the touch control channel.

Figure 12:
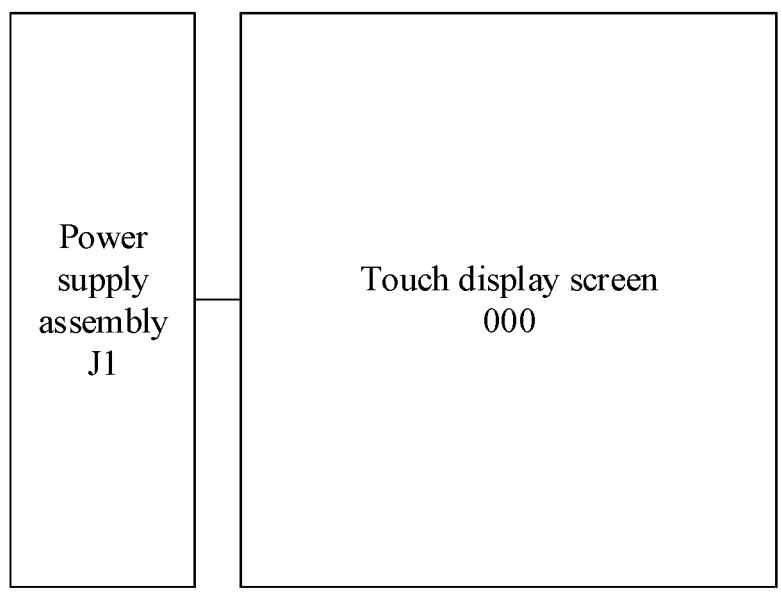
FIG. 12 is a schematic structural diagram of an electronic device according to an embodiment of the present disclosure.

FIG. 12 is a schematic structural diagram of an electronic device according to an embodiment of the present disclosure. As shown in FIG. 12, the electronic device may include a power supply assembly 100, and the touch display screen 000 as shown in FIG. 11.

The power supply assembly 100 may be coupled to the touch display screen 000 and is configured to supply power to the touch display screen 000.

As shown in FIGS. 1 to 9, the touch module includes a carrier layer 1, a first metal mesh layer 2, an insulating layer 3, a second metal mesh layer 4 and a protective layer 5 that are sequentially laminated.

The second metal mesh layer 4 includes a first region 41 and a second region 42. A plurality of touch units 411 are formed in the first region 41, a first electrode 421 is formed in the second region 42, and a dummy electrode 4211 is disposed in the first electrode 421. The first electrode 421 is coupled to the touch unit 411 adjacent to one side of the second region 42. The first metal mesh layer 2 is provided with a third region 21, and the third region 21 and the second region 42 correspond to each other and are of the same shape and size. A second electrode 211 is formed in the third region 21, and the second electrode 211 is coupled to the touch unit 411 adjacent to another side of the second region 42 through a via hole 5. The first electrode 421 and the second electrode 211 form a touch unit 411.

Specifically, the touch module in this embodiment may directly adopt the touch module provided in the above embodiment, and reference may be made to the related contents described in the above embodiment for the specific implementation structure, which is not repeated herein.

The touch module provided in the technical solution of the present disclosure is provided with the first metal mesh layer 2 and the second metal mesh layer 4. The plurality of touch units 411 disposed in the first region 41 of the second metal mesh layer 4 may correspond to the surface of the display screen for achieving a touch function of the surface of the display screen, and the second region 42 may be disposed at the rounded corner of the display screen; and/or, a hollowed-out portion facing the hole of the display screen is provided in the second region 42, that is, the second region 42 faces the hole of the display screen. In this way, by setting the second region 42 as the first electrode 421, and setting the third region 21 corresponding to the second region 42 and disposed in the first metal mesh layer 2 as the second electrode 211, it's ensured that the touch unit 411 formed of the first electrode 421 and the second electrode 211 may have a large capacitive signal intensity, which can improve the touch sensitivity at the hole and the rounded corner of the display screen corresponding to the second region 42.

In addition, as described above, in the touch module provided by the embodiments of the present disclosure, there is no need to provide an additional signal coupling wire in the second region 42 corresponding to the hole of the display screen, that is, there is no need to provide an additional signal coupling wire by which the second region 42 is coupled to the touch unit 411 in the first region 41. Therefore, the hole of the display screen may be designed to be frameless. Moreover, since there is no need to provide a signal coupling wire, the panel is prevented from cracks caused by cutting at the hole position, thereby avoiding poor touch caused by local breakage of the touch control channel.

Numerous specific details are set forth in the description provided herein. However, it may be understood that the embodiments of the present disclosure may be implemented without these specific details. In some examples, well-known structures and techniques have not been shown in detail in order not to obscure this description.

Similarly, it should be understood that various features of the present disclosure are sometimes grouped together in a single embodiment, figure, or description thereof for simplifying the present disclosure and assisting in understanding of one or more of the invention aspects. However, the device of the present disclosure should not to be construed as reflecting an intention that the claimed present disclosure claims more features than those expressly defined in each claim. Rather, as reflected in the claims, the inventive aspect lies in features less than all the features of the single embodiment previously disclosed. Thus, the claims following a specific implementation are expressly incorporated into this implementation, and each claim serves as an individual embodiment of the present disclosure.

The above descriptions are merely optional embodiments of the present disclosure, and are not intended to limit the present disclosure in any form. Any simple amendments, equivalent variations and modifications made to the above embodiments according to the technical essence of the present disclosure shall fall within the scope of the technical solutions of the present disclosure.

What is claimed is:

1. A touch module, comprising:
   a carrier layer, a first metal mesh layer, an insulating layer and a second metal mesh layer that are sequentially laminated; wherein
   the second metal mesh layer is provided with a first region and a second region, and the second metal mesh layer comprises a plurality of touch units disposed in the first region and a first electrode disposed in the second region, wherein the first electrode is directly coupled to a first touch unit of the plurality of touch units, and the first touch unit is adjacent to a first side of the second region; and
   the first metal mesh layer is provided with a third region, an orthographic projection of the third region on the carrier layer being overlapped with an orthographic projection of the second region on the carrier layer, and the first metal mesh layer comprises a second electrode disposed in the third region, wherein the second electrode is coupled to a second touch unit of the plurality of touch units, the second touch unit is adjacent to another side of the second region, and the first electrode and the second electrode are configured to form a target touch unit; and
   wherein the orthographic projection of the third region on the carrier layer and the orthographic projection of the second region on the carrier layer coincide with each other; and
   a hollowed-out portion facing a hole of the display screen is provided in the second region.

2. The touch module according to claim 1, wherein the first side and a second side are two adjacent sides of the second region.

3. The touch module according to claim 1, wherein each of the touch units in the first region comprises a sensing electrode and a driving electrode; wherein
   the first electrode is coupled to one of the sensing electrode and the driving electrode of the first touch unit, and the second electrode is coupled to the other one of the sensing electrode and the driving electrode of the second touch unit.

4. The touch module according to claim 1, wherein an orthographic projection of the first electrode on the carrier layer and the orthographic projection of the second region on the carrier layer are overlapped with each other, and an orthographic projection of the second electrode on the carrier layer and the orthographic projection of the third region on the carrier layer are overlapped with each other.

5. The touch module according to claim 1, wherein the second region is hollowed out in the middle, and the third region is hollowed out in the middle;
   wherein an orthographic projection of the hollowed-out portion of the second region on the carrier layer is overlapped with an orthographic projection of a hollowed-out portion of the third region on the carrier layer.

6. The touch module according to claim 5, wherein the orthographic projection of the hollowed-out portion of the second region on the carrier layer and the orthographic projection of the hollowed-out portion of the third region on the carrier layer coincide with each other.

7. The touch module according to claim 1, wherein a size of the second region is the same as a size of a region occupied by one touch unit in the first region, and a shape of the second region is the same as a shape of the region occupied by the one touch unit in the first region.

8. The touch module according to claim 7, wherein
   the second metal mesh layer comprises one first electrode disposed in the second region; and
   a quantity of the second electrodes in the first metal mesh layer equals a quantity of the first electrodes in the second metal mesh layer.

9. The touch module according to claim 1, wherein a size of the second region is the same as a size of a region occupied by the plurality of touch units in the first region, and a shape of the second region is the same as a shape of the region occupied by the plurality of touch units in the first region.

10. The touch module according to claim 9, wherein
    the second metal mesh layer comprises one or more first electrodes disposed in the second region; and
    a quantity of the second electrodes in the first metal mesh layer equals a quantity of the first electrodes in the second metal mesh layer.

11. The touch module according to claim 1, wherein the second region is provided with a rounded corner.

12. The touch module according to claim 1, wherein the second metal mesh layer further comprises: one or more dummy electrodes disposed on the first electrode.

13. The touch module according to claim 1, wherein the carrier layer is made from SiNx or SiOx; or, the carrier layer is a transparent glass layer.

14. The touch module according to claim 1, wherein the second electrode and the second touch unit are coupled through a via hole.

15. The touch module according to claim 14, wherein one end of the via hole is disposed at an intersection of two metal wires of the first metal mesh layer, and the other end of the via hole is disposed at an intersection of two metal wires of the second metal mesh layer.

16. The touch module according to claim 1, further comprising: a protective layer disposed on a side, distal from the carrier layer, of the second metal mesh layer.

17. The touch module according to claim 16, wherein the protective layer is made from an organic material.

18. A touch display screen, comprising a display screen and the touch module as defined in claim 1.

19. An electronic device, comprising a power supply assembly and the touch display screen as defined in claim 18;
  wherein the power supply assembly is coupled to the touch display screen and configured to supply power to the touch display screen.

* * * * *